UNITED STATES PATENT OFFICE.

THOMAS HODGSON, OF BROOKLYN, NEW YORK.

IMPROVED COMPOUND FOR PAINT AND ARTIFICIAL STONE.

Specification forming part of Letters Patent No. 85,825, dated January 12, 1869.

*To all whom it may concern:*

Be it known that I, THOMAS HODGSON, of the city of Brooklyn, in the county of Kings and State of New York, have invented a new Composition for Paint and Artificial Stone; and I do hereby declare that the following is a full, clear, and exact description of the component parts of and methods of compounding the same.

My invention is capable of many modifications, but all are based upon a compound of lime and oxalic acid. For various purposes I add pearl or bitter spar, sand, gravel, grit, quartz, emery, tripoli, granular glass, marble-dust, terra-alba, flocks, or mineral fiber, oxide of zinc, frostings, or thin scales of glass, tannic acid, alkaline silicates, or water glass, alum, sulphate of zinc, or other ingredients not incompatible with a compound of lime and oxalic acid.

For the manufacture of an artificial stone, I generally prepare two solutions of oxalic acid—viz., one, which I will call "No. 1 solution," made by dissolving four (4) ounces of oxalic acid in one (1) gallon of water, or like proportions in different quantities.

I take one part, by measure, of lime, reduced to a fine powder, and add a sufficient quantity of solution No. 1 to make a paste, and for every measure of lime I then add sufficient clean-washed and dry sand, and make a moist mortar-like composition which may be molded into various forms.

By sifting a little frostings or glass-scales on the faces of the molds, previous to filling the latter with the composition, the molded articles are caused to have a sparkling appearance on the surface.

The composition may be filled into the molds by hand, or in any other suitable manner.

As soon as the articles have been molded they may be removed from the molds and put away to dry in the atmosphere. The time occupied in drying will vary from two to five days, according to the size of the articles.

When dry, the articles are put into a bath of No. 2 solution, for from two (2) to ten (10) hours, according to bulk, for the purpose of induration, and when they have been taken from the bath and dried they are ready for use, and will stand any weather, the compound of oxalic acid and lime forming one of the most insoluble salts of lime. Other materials may be added to the above composition, if desired.

I have also found that lime slaked with a solution of sulphate of zinc, which I will call "No. 3 solution," made in the proportion of four ounces of sulphate of zinc to one (1) gallon of water, and afterward treated with No. 1 solution of oxalic acid, makes a good artificial stone, as does lime slaked with a solution of alum, in the proportion of sixteen (16) ounces of the alum of commerce to one (1) gallon of water, and afterward treated with the No. 1 solution of oxalic acid.

To make a white paint, I take two parts, by measure, of impalpably-powdered air-fallen or lightly-slaked lime, and make it into a firm paste, with a sufficient quantity of the No. 3 sulphate-of-zinc solution, above described; and I also take two parts, by measure, of impalpably-powdered spar or marble-dust, and four parts, by measure, of white oxide of zinc, triturate them intimately together in the dry state, and mix them into a firm paste, with a sufficient quantity of the No. 1 oxalic-acid solution, and I then reduce these two mixtures, together with a sufficient quantity of liquid silex or water-glass, to a suitable consistency for use as paint.

To produce colored paints, I add any suitable coloring-matter.

Having thus described the manufacture of artificial stone and paint according to my invention, I wish it to be distinctly understood that I do not confine myself strictly to the proportions of the ingredients or manner of compounding the same which I have described, as the said proportions and method may be varied to some extent without materially affecting the result; but

What I claim as my invention, and desire to secure by Letters Patent, is—

1. The compound of lime and oxalic acid herein specified as the basis of a composition for artificial stone or paint.

2. Compounds of lime, oxalic acid, and sulphate of zinc, substantially as herein described, in paint and artificial stone.

3. A compound of lime, oxalic acid, and alum, substantially as herein described, in paint and artificial stone.

THOS. HODGSON.

Witnesses:
 HENRY T. BROWN,
 FRED. HAYNES.